(12) United States Patent
Calhoun (10) Patent No.: US 11,255,668 B2
(45) Date of Patent: Feb. 22, 2022

(54) LEVEL AND LEVEL ASSEMBLY

(71) Applicant: Joseph J. Calhoun, Luck, WI (US)

(72) Inventor: Joseph J. Calhoun, Luck, WI (US)

( * ) Notice: Subject to any disclaimer, the term of this patent is extended or adjusted under 35 U.S.C. 154(b) by 0 days.

(21) Appl. No.: 17/060,437

(22) Filed: Oct. 1, 2020

(65) Prior Publication Data
US 2021/0262795 A1 Aug. 26, 2021

Related U.S. Application Data

(60) Provisional application No. 62/979,836, filed on Feb. 21, 2020.

(51) Int. Cl.
*G01C 9/28* (2006.01)
*G01C 9/34* (2006.01)

(52) U.S. Cl.
CPC .............. *G01C 9/34* (2013.01); *G01C 9/28* (2013.01)

(58) Field of Classification Search
CPC ........................................ G01C 9/28
USPC ................................................ 33/381
See application file for complete search history.

(56) References Cited

U.S. PATENT DOCUMENTS

| | | | | |
|---|---|---|---|---|
| 5,894,675 A * | 4/1999 | Cericola | ............ | G01B 3/00 33/451 |
| 7,117,606 B2 * | 10/2006 | Brown | ............ | G01C 9/28 33/365 |
| 8,281,496 B1 * | 10/2012 | Mies | ............ | G01C 9/26 33/381 |
| 8,720,073 B1 * | 5/2014 | Gordon | ............ | E04F 21/0015 33/194 |
| 8,910,390 B2 * | 12/2014 | Steele | ............ | G01C 9/18 33/347 |
| 9,874,421 B2 * | 1/2018 | Stockdill | ............ | F41G 1/44 |
| 9,909,867 B2 * | 3/2018 | Schubert | ............ | G01C 15/00 |
| 10,317,209 B2 * | 6/2019 | LaSota | ............ | G01C 9/28 |
| 2021/0220893 A1 * | 7/2021 | Sullivan | ............ | G01C 9/28 |

OTHER PUBLICATIONS

SWFA SS-Tac 30mm Bubble Level w/ 1" Inserts [online]; 2021, SWFA Inc. [retrieved on Apr. 13, 2021]. Retrieved from the Internet: <URL:https://www.swfa.com/swfa-ss-tac-30mm-bubble-level-with-1-inserts.html>; 3 pages.

* cited by examiner

*Primary Examiner* — George B Bennett
(74) *Attorney, Agent, or Firm* — Mueting Raasch Group (57) ABSTRACT

Detailed herein is a level device having a body having a first face, an opposing second face, and a perimeter extending between the first and second faces. The perimeter includes first, second, third, and fourth sides, where a first reference surface extends along the third side and a second reference surface extends along the fourth side orthogonal to the first reference surface. A third reference surface may be between the first and second reference surfaces disposed at a 45-degree angle relative to each of the first and second reference surfaces. A first bubble vial having a first longitudinal axis parallel to the first reference surface is received in a first recess defined along the first side, and a second bubble vial having a second longitudinal axis parallel to the second reference surface is received in a second recess defined along the second side.

17 Claims, 5 Drawing Sheets

LEVEL AND LEVEL ASSEMBLY

The present application claims the benefit of U.S. Provisional Application No. 62/979,836, filed 21 Feb. 2020, the disclosure of which is incorporated by reference herein in its entirety.

TECHNICAL FIELD

This disclosure relates generally to hand tools and, more specifically, to hand tools for determining whether a surface is horizontal or vertical or at a 45-degree angle.

SUMMARY

The present disclosure relates to a level device. The level device includes a body including a first face, an opposing second face, and a perimeter extending between the first face and the opposing second face. The perimeter comprises a first side, a second side, a third side, and a fourth side. A first reference surface extends along the third side, a second reference surface extends along the fourth side orthogonal to the first reference surface. A third reference surface may be disposed between the first and second reference surfaces disposed at a 45-degree angle relative to each of the first and second reference surfaces. A first bubble vial having a first longitudinal axis parallel to the first reference surface is received in a first recess defined along the first side, and a second bubble vial having a second longitudinal axis parallel to the second reference surface is received in a second recess defined along the second side.

According to an embodiment of the present disclosure, a level assembly includes a level, a level attachment mechanism embedded in, or integrally formed with, the body of the level, and a leveling extension. The level includes a body comprising a first face, an opposing second face, and a perimeter extending between the first face and the opposing second face. The perimeter of the level includes a first side, a second side, a third side, and a fourth side. A first reference surface extends along the third side, and a second reference surface extends along the fourth side orthogonal to the first reference surface. A first bubble vial having a first longitudinal axis parallel to the first reference surface is received in a first recess defined along the first side, and a second bubble vial having a second longitudinal axis parallel to the second reference surface is received in a second recess defined along the second side. The leveling extension includes a first plate comprising a first extension reference surface and a second plate comprising a second extension reference surface orthogonal to the first extension reference surface. An extension attachment mechanism is comprised in at least one of the first plate and the second plate. The extension attachment mechanism is configured to couple with the level attachment mechanism to releasably couple the level to the leveling extension such that the first extension reference surface is parallel to the first reference surface of the level and the second extension reference surface is parallel to the fourth reference surface of the level.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

In many environments, such as construction and/or design, accurately determining a level (or plumb) surface is necessary for the proper function and/or aesthetics of a project. However, the configuration of various workpieces makes using a typically sized and shaped level challenging. Embodiments of the level devices described herein are directed to mitigating or avoiding complications of using a typical leveling device.

Figure 1:
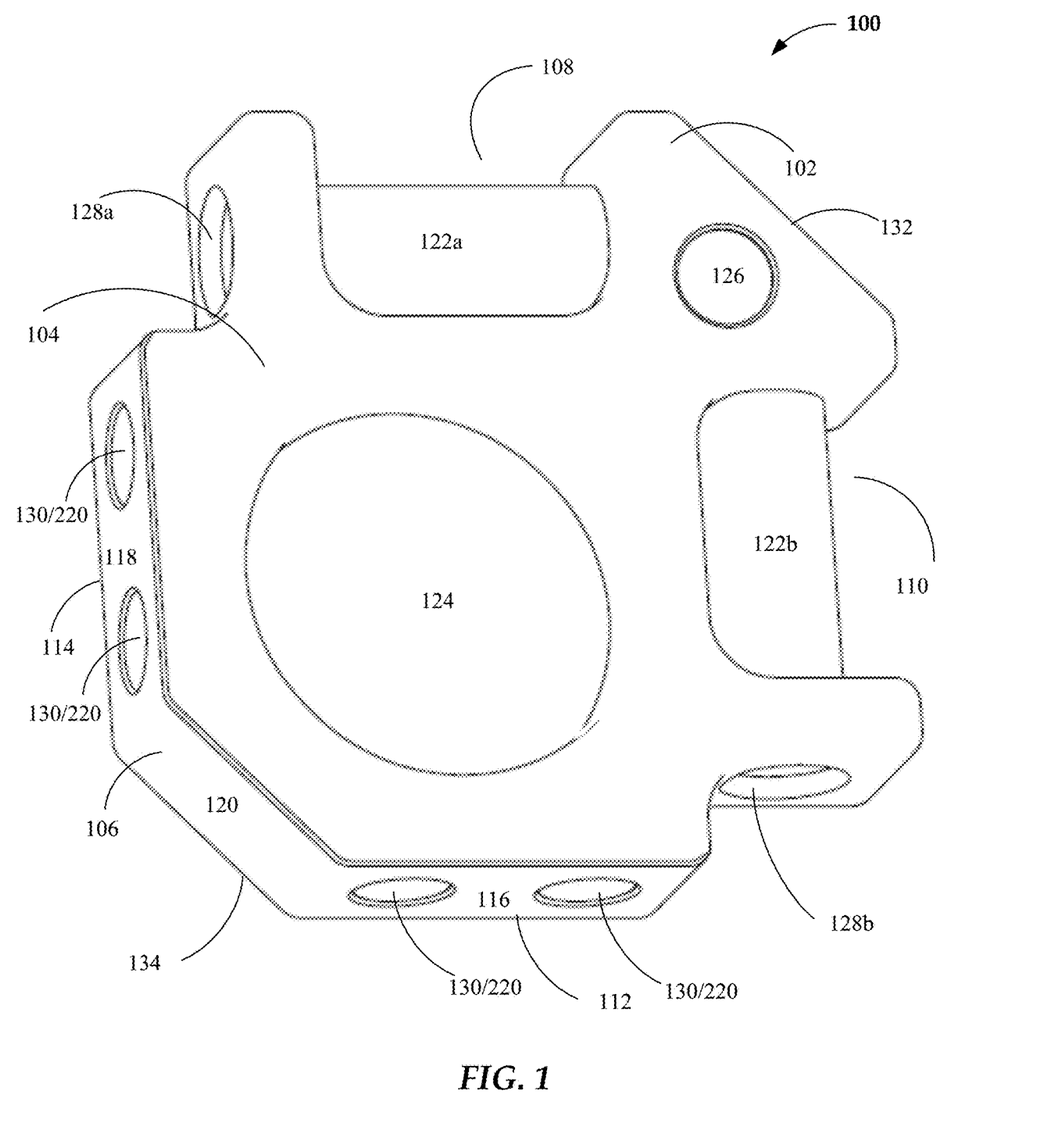
FIG. 1 is a perspective view of a level device in accordance with certain embodiments.

FIG. 1 is a perspective view of a level device 100 in accordance with various embodiments described herein. The level includes a body 102 having a first face 104, an opposing second face 134, and a perimeter 106 extending between the first face 104 and the second, opposing face 134. The perimeter 106 may comprise a variety of shapes. According to an embodiment, the perimeter 106 has at least a first side 108, a second side 110, a third side 112, and a fourth side 114. The various sides of the perimeter 106 define a plurality of references surfaces.

The term "reference surface" is used here to refer to a surface extending along a plane. Together with a level indicator (e.g., a bubble vial) disposed parallel to the reference surface, the reference surface may be used to indicate a planar, level surface. Together with a level indicator (e.g., a bubble vial) disposed at a 45-degree angle to the reference surface, the reference surface may be used to indicate a planar surface at a 45-degree angle to the level plane.

The term "level," when used as an adjective in reference to a plane or surface, is used here to refer to both the horizontal and vertical planes or surfaces such that an indication of "level" can identify one or both of the x and y directions of a plane or surface.

According to an embodiment, a first reference surface 116 extends along the third side 112, and a second reference surface 118 extends along the fourth side 114 orthogonal to the first reference surface 116. The level device 100 may further include a third reference surface 120 that extends between the first and second reference surfaces 116, 118. The third reference surface 120 may be disposed at a 45-degree angle relative to each of the first 116 and second 118 reference surfaces. The level device 100 may further include a fourth reference surface 132 parallel to the third reference surface 120. In addition, one or both of the first 104 and second 134 faces may form a reference surface.

The level device 100 includes at least one level indicator (e.g., a bubble vial). A bubble vial is a sealed tube constructed of transparent material (e.g., glass or plastic) and includes a liquid and a gas bubble disposed within the cylindrical tube. When the longitudinal axis of the vial is horizontal, the gas bubble is positioned in the center of the vial, indicating a level position. The bubble vial may include markings to help a user identify or gauge when the gas bubble is in the center of the vial. In some embodiments, based on the position of the gas bubble in relation to gravity, an angular orientation of a longitudinal axis of the bubble vial 122a,b and corresponding level device 100 may be determined. In other words, because of gravity attracting the liquid contained in the bubble vial 122a,b, the gas bubble is moved further away from the center. The inclusion of two bubble vials 122a,b, in an orthogonal orientation to each other allows the level device 100 to evaluate the orientation of multiple surfaces simultaneously.

As shown in FIG. 1, a first bubble vial 122a is received in a first recess defined along the first side 108. The first bubble vial 112a is positioned so that the longitudinal axis of the vial is parallel to the first reference surface 116. The longitudinal axis of the first bubble vial 112a may be disposed at a 45-degree angle relative to the third reference surface 120 and optionally the fourth reference surface 132. The longitudinal axis of the first bubble vial 112a may also be parallel to one or both of the reference surfaces formed by the first face 104 and the second face 134. A second bubble vial 122b is received in a second recess defined along the second side 110. The second bubble vial 122b is positioned so that the longitudinal axis of the vial is parallel to the second reference surface 118. The longitudinal axis of the second bubble vial 112b may be disposed at a 45-degree angle relative to the third reference surface 120 and optionally the fourth reference surface 132. The longitudinal axis of the second bubble vial 112b may also be parallel to one or both of the reference surfaces formed by the first face 104 and the second face 134.

The level device 100 may optionally include one or more apertures. For example, the body 102 may include an opening 124 that extends through the body 102 from the first face 104 to the second face 134. Opening 124 is spaced from the perimeter and may be positioned approximately in the center of the body 102 or disposed offset from a reference surface of the perimeter. While the opening 124 is shown as being circular, the opening may be any variety of shapes. Opening 124 may be sized to accommodate a finger of a user. A user may hold the level device 100 by extending a finger through the opening 124 or otherwise grasp the body 102 of the level device 100. The body 102 may be held by and/or rotated around the user's finger (or other instrument) inserted through the opening 124 in order to position the level device 100 against a surface.

The body 102 may optionally include further apertures such as opening 126. Opening 126 may be sized to accommodate a marking instrument or a fastening device to secure (e.g., temporarily) the level device 100 to a workpiece for rotation about the fastening device.

While the size of the level device 100 is not particularly limited and the device may have any variety of overall dimensions, in certain embodiments, the length, width, and thickness are configured so as to be able to hold the device with one hand. For example, the dimensions of the device may be such that the device may be held and used with a single finger placed in opening 124. The width of the device 100 may be such that adjacent fingers may reach outside the second 110 and fourth 114 sides of the level 100. Exemplary dimensions of the device include a length between about 1.5 to 2.5 inches (38 to 64 mm), a width between 1.5 to 2.5 inches (38 to 63 mm), and/or a thickness between 0.4 to 0.75 inches (10 to 19 mm).

Further apertures may be provided for receiving and securing the bubble vials 122a,b in recesses of the body 102 sides (e.g., first side 108 and second side 110). The bubble vials 122a,b are configured to fit within a recess in the side (e.g., first side 108) of the body 102 such that the bubble vials 122a,b do not interfere with the various reference surfaces contacting a surface against which the level device 100 is placed during use. A plurality of securing components, e.g., O-rings, snap-locks, etc., may be used to secure the one or more bubble vials 122a, b to, or within, a side of the body 102. For example, O-rings 128a, b may be disposed between one or more of bubble vials 122a, b and a surface of the side in which it is secured. The O-rings 128a, b may be disposed within such apertures.

The body 102 may be configured to secure the level device 100 to one or more work pieces or accessories. The body 102 may include one or more attachment mechanisms. For example, the body 102 may include one or more apertures 130 in one or more sides 108, 110, 112, 114, configured to receive an attachment mechanism. The attachment mechanism may be a variety of components including a plug and/or a magnet (e.g., magnet 220 embedded in aperture 130). The attachment mechanism may be embedded in the aperture 130 with an outer surface of the attachment mechanism adjacent an outer surface (e.g., a reference surface) of the body 102. The outer surface of the attachment mechanism may be an exposed surface. In some embodiments, the attachment mechanism may be embedded in the body 102 such that the outer surface is below the outer surface of the body 102. In embodiment where the outer surface of the attachment mechanism is an exposed surface, the exposed surface is flush with or below the outer surface of the body such that the attachment mechanism does not interfere with the use of a reference surface. For example, the exposed surface may be substantially flush, or planar, with a side surface of the body 102. One or more apertures 130 may be present on one or more sides of the body 102. For example, a first magnet may be recessed within an aperture 130 of one of the first 116 and second 118 reference surfaces with an exposed magnet surface positioned substantially flush with the reference surface, and a second magnet may be similarly recessed within another reference surface. In one embodiment, one or more magnets with an exposed magnet surface are disposed within both the first and second reference surfaces 116, 118. An attachment mechanism (e.g., a magnet) may also be similarly recessed within one, or both, of the first 104 and second 134 faces and/or with the third reference surface 120. In certain embodiments, a first magnet is recessed within the first reference surface 116 having an outer surface substantially flush with the first reference surface 116, a second magnet is recessed within the second reference surface 118 having a similarly outer surface with the second reference surface 118, and a third magnet is recessed within the first 104 or second 134 face having a similarly outer surface with the face. Additional magnets, similarly recessed, may be included in one or more of the surfaces. The attachment mechanism may be constructed to couple the level device 100 with one or more workpieces and/or with one or more leveling extension accessories.

In certain embodiments a level device is coupled with an accessory such as a leveling extension in a level assembly. A level assembly includes a level having a body and first and second bubble vials. The body includes a first face, an opposing second face, and a perimeter extending between the first face and the opposing second face. The perimeter includes a first side, a second side, a third side, and a fourth side. A first reference surface extends along the third side, and a second reference surface extends along the fourth side orthogonal to the first reference surface. An optional third reference surface may be disposed at a 45-degree angle relative to each of the first and second reference surfaces. A first bubble vial having a longitudinal axis parallel to the first reference surface is received in a first recess defined along the first side, and a second bubble vial having a longitudinal axis parallel to the second reference surface is received in a second recess defined along the second side. A level attachment mechanism is embedded in, or integrally formed with, the level body. The level assembly further includes a leveling extension. The leveling extension includes a first plate comprising a first extension reference surface and a second plate comprising a second extension reference surface orthogonal to the first extension reference surface. The leveling extension further includes an extension attachment mechanism in at least one of the first plate and second plate. The extension attachment is configured to couple with the level attachment mechanism to releasably couple the level to the leveling extension such that the first extension reference surface is parallel to the first reference surface of the level and the second extension reference surface is parallel to the second reference surface of the level.

Figure 2A:
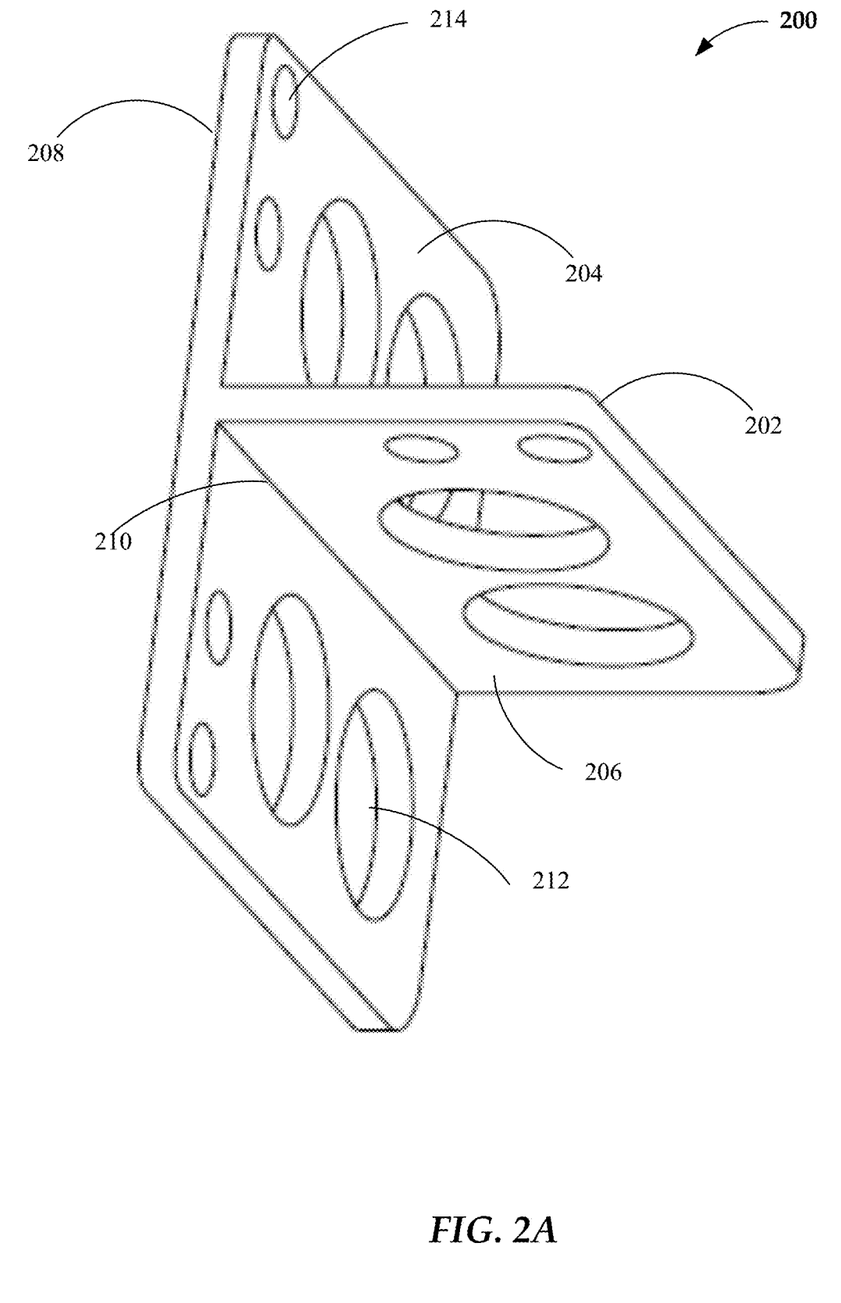
FIG. 2A is a perspective view of an extension attachment for the level device of FIG. 1 in accordance with certain embodiments.
Figure 2B:
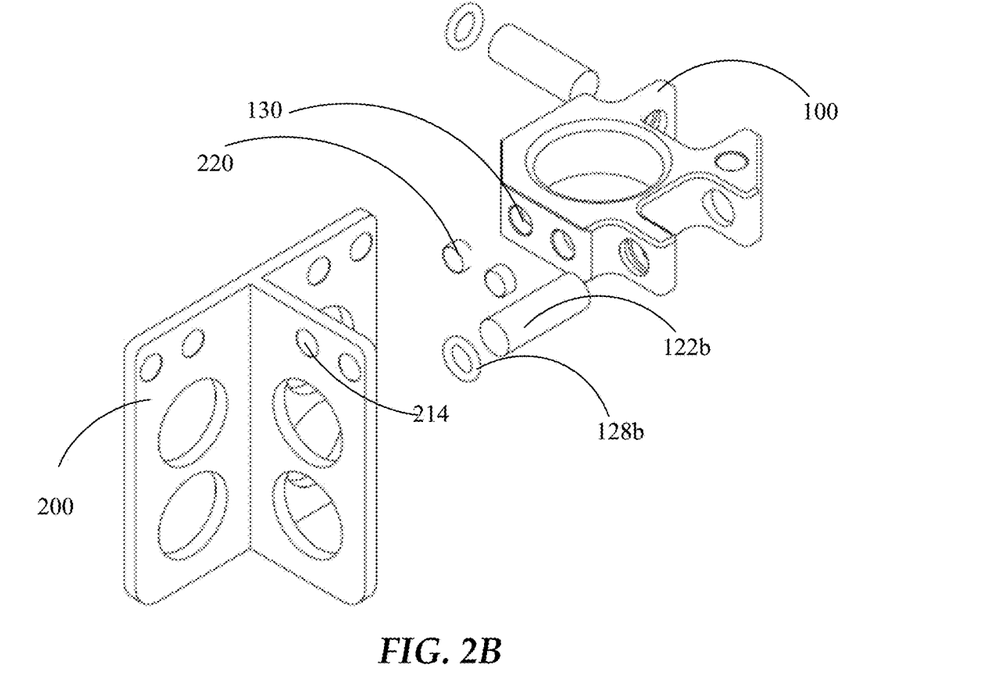
FIG. 2B is an exploded view of the extension attachment of FIG. 2A with the level device of FIG. 1 in accordance with certain embodiments.
Figure 2C:
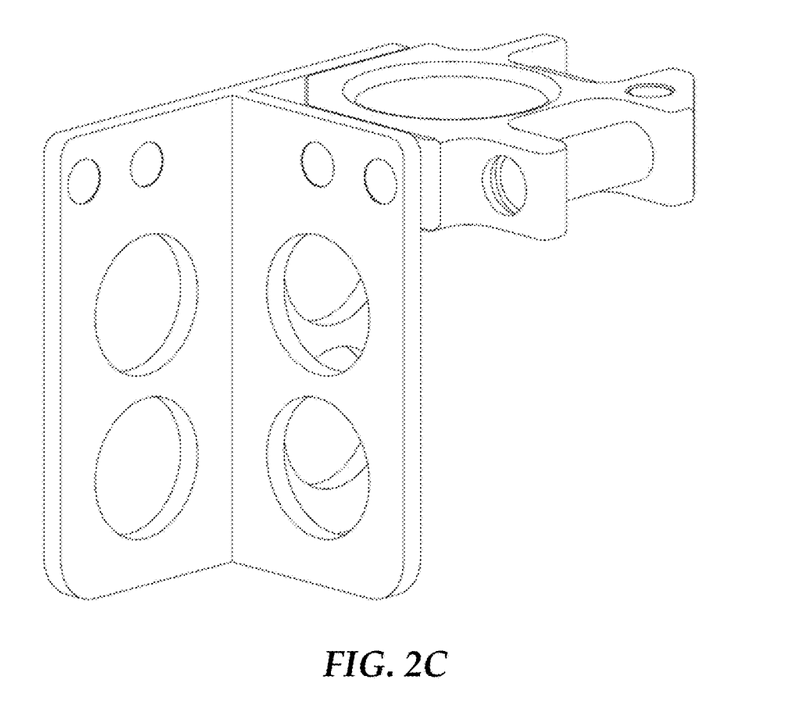
FIG. 2C is a perspective view of the extension attachment of FIG. 2A coupled with the level device of FIG. 1 in accordance with certain embodiments.

FIGS. 2A-C illustrate an example embodiment of a leveling extension 200 and a level assembly including such a leveling extension. FIG. 2A is a perspective view of a leveling extension. The inclusion of a leveling extension extends the reach of a level device and may be used, for example, with larger workpieces or surfaces. A first plate 202 has a first extension reference surface 206, and a second plate 204 has a second extension reference surface 208. While the first plate 202 is shown as bisecting the second plate 204, the first plate 202 may be coupled to the second plate 204 at any position along the length of the second plate 204. Also, although the first and second plates 202, 204 are shown having the same width 210, they may alternatively have different length, width, or thickness dimensions from one another.

Similar to the level device 100 described above, the leveling extension 200 may include one or more apertures. For example, one or both of the first and second plates 202, 204 may include an aperture 212 configured for handling the level assembly. The aperture(s) 212 may be any shape, though shown as circular, and may be sized to fit a user's finger. Also, one or both of the first and second plates 202, 204 may include one or more apertures 214 to receive an extension attachment mechanism. Therefore, aperture 214 would be sized substantially similarly to aperture(s) 130 of level device 100. As discussed above, the level attachment mechanism may include a magnet or magnetic material embedded in the aperture 214 having an outer surface flush with the first or second extension reference surface 206, 208. The attachment mechanism may also be recessed within the first or second plate 202, 204 so long as it is strong enough to couple the leveling extension 200 with a level and not interfere with a reference surface being placed flush with a workpiece. In one embodiment, the leveling extension 200 is constructed of a magnetic material, in which case additional attachment mechanisms are optional.

FIG. 2B shows an exploded view of the level assembly including the level device 100 and leveling extension 200. The assembled level assembly is shown in FIG. 2C. As may be seen in the figures, a magnet 220 is embedded in aperture 130 to be mated with a magnet embedded in aperture 214. As discussed above, one or more reference surfaces and/or sides and/or faces of the level device 100 may include one or more magnet attachment mechanisms. While shown attached to a first side of first plate 202 of the leveling extension in FIG. 2C, it may be seen that the level device 100 could alternatively be coupled to a second, opposing side of the first plate 202. The attachment mechanism may provide for a variety of configurations for the level assembly. This allows for checking the levelness of one or more surfaces simultaneously. Also, the ability to removably couple the leveling extension allows for quick reconfiguration of the assembly, such as when working with a project or single workpiece having disparate surfaces.

Figure 3A:
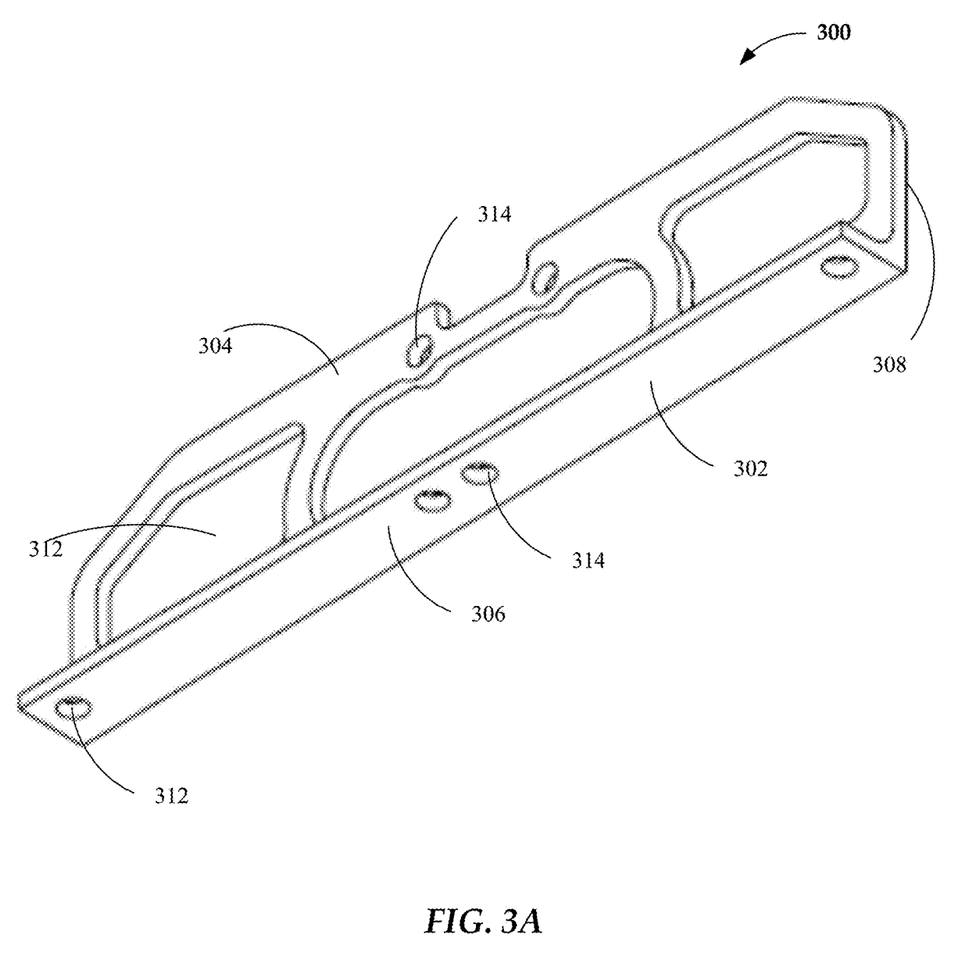
FIG. 3A is a perspective view of an extension attachment for the level device of FIG. 1 in accordance with certain embodiments.
Figure 3B:
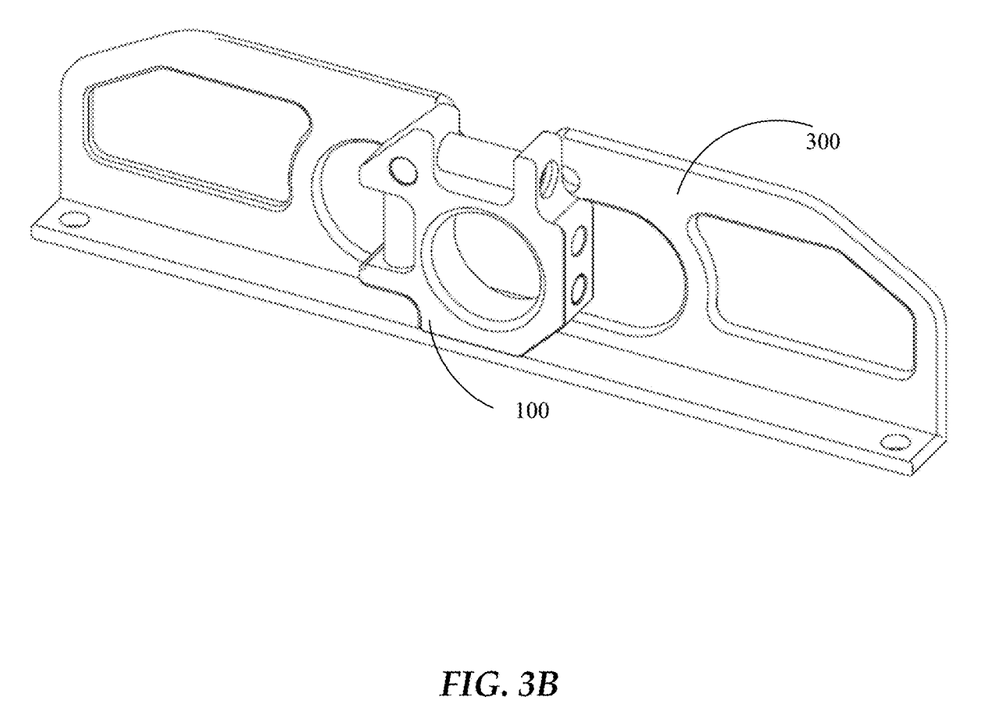
FIG. 3B is a perspective view of the extension attachment of FIG. 3A coupled with the level device of FIG. 1 in accordance with certain embodiments.

FIGS. 3A-B illustrate an alternative example embodiment of a leveling extension 300 and a level assembly including such a leveling extension. FIG. 3A is a perspective view of a leveling extension. The inclusion of a leveling extension extends the reach of a level device and may be used, for example, with larger workpieces or surfaces. A first plate 302 has a first extension reference surface 306, and a second plate 304 has a second extension reference surface 308. Although the first and second plates 302, 304 are shown having the same length, they may alternatively have different length, width, or thickness dimensions from one another.

Similar to the level device 100 described above, the leveling extension 300 may include one or more apertures. For example, one or both of the first and second plates 302, 304 may include an aperture 312 configured for handling the level assembly. The aperture(s) 312 may be any shape, though shown as corresponding to the shape of the second plate 304, and may be sized to fit a user's finger. For example, larger apertures 312 may reduce the weight of the leveling extension 300 as well as manufacturing costs. Also, one, or both, of the first and second plates 302, 304 may include one or more apertures 314 to receive an extension attachment mechanism. Therefore, aperture 314 would be sized substantially similarly to aperture(s) 130 of level device 100. As discussed above, the level attachment mechanism may include a magnet embedded in the aperture 314 having an outer surface flush with the first or second extension reference surface 306, 308. The magnet may also be recessed within the first or second plate 302, 304 so long as it is strong enough to couple the leveling extension 300 with a level and not interfere with a reference surface being placed flush with a workpiece.

FIG. 3B shows an assembled view of a level assembly including the level device 100 and leveling extension 300. As discussed above, one or more reference surfaces and/or sides and/or faces of the level device 100 may include one or more magnet attachment mechanisms. While leveling attachment 300 is shown coupled to a first face of the level device 100, it could be coupled to an opposing face of the level device 100 if level attachment mechanisms are disposed in the opposing face. The attachment mechanism may provide for a variety of configurations for the level assembly. This allows for checking the levelness of one or more surfaces (e.g., x and y directions of a plane, or two orthogonal surfaces) simultaneously. Also, the ability to removably couple the leveling extension allows for quick reconfiguration of the assembly when working with a project or single workpiece having disparate surfaces.

As discussed herein, the disclosed level device 100 is a versatile tool for determining the levelness (or 45-degree angle) of one or more surfaces of a workpiece. The level device 100, the leveling extension 200, 300, and any other components described herein may be formed of plastic, metal (e.g., stainless steel, aluminum, or the like), glass, or other suitable material and combinations thereof. The materials may be selected to keep the device and/or assembly lightweight so that it may be held in place by one hand, or one to three fingers, of a user.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A level device comprising:
    a body comprising a first face, an opposing second face, and a perimeter extending between the first face and the opposing second face;
    the perimeter comprising a first side, a second side, a third side, and a fourth side, a first reference surface extending along the third side, a second reference surface extending along the fourth side orthogonal to the first reference surface, and a third reference surface between the first and second reference surfaces disposed at a 45-degree angle relative to each of the first and second reference surfaces;
    a first bubble vial received in a first recess defined along the first side, the first bubble vial having a first longitudinal axis parallel to the first reference surface; and
    a second bubble vial received in a second recess defined along the second side, the second bubble vial having a second longitudinal axis parallel to the second reference surface.

2. The device of claim 1, wherein at least one of the first and second faces comprises a fourth reference surface.

3. The device of claim 1 further comprising an opening extending through the body from the first face to the opposing second face.

4. The device of claim 3, wherein the opening is sized to accommodate a finger of a user.

5. The device of claim 1 further comprising a plurality of O-rings disposed between the first bubble vial and a surface of the first side and between the second bubble vial and a surface of the second side.

6. The device of claim 1 further comprising a first magnet recessed within one of the first and second reference surfaces with an outer surface of the first magnet positioned substantial flush with the reference surface.

7. The device of claim 6 further comprising a second magnet recessed within another one of the first and second reference surfaces.

8. The device of claim 6 further comprising a second magnet recessed within one of the first or second faces with an outer surface of the second magnet positioned substantially flush with the first or second face.

9. The device of claim 1 further comprising:
    a first magnet recessed within the first reference surface with an outer surface of the first magnet positioned substantially flush with the first reference surface;
    a second magnet recessed within the second reference surface with an outer surface of the second magnet positioned substantially flush with the second reference surface; and
    a third magnet recessed within the first or second face with an outer surface of the third magnet positioned substantially flush with the first or second face.

10. The device of claim 1 further comprising a fourth reference surface parallel to the third reference surface.

11. A level assembly comprising:
    a level comprising:
        a body comprising a first face, an opposing second face, and a perimeter extending between the first face and the opposing second face;
        the perimeter comprising a first side, a second side, a third side, and a fourth side, a first reference surface extending along the third side, a second reference surface extending along the fourth side orthogonal to the first reference surface;
        a first bubble vial received in a first recess defined along the first side, the first bubble vial having a first longitudinal axis parallel to the first reference surface; and
        a second bubble vial received in a second recess defined along the second side, the second bubble vial having a second longitudinal axis parallel to the second reference surface; and
    a level attachment mechanism embedded in or integrally formed with the body; and
    a leveling extension comprising:
        a first plate comprising a first extension reference surface;
        a second plate comprising a second extension reference surface orthogonal to the first extension reference surface;
        an extension attachment mechanism comprised in at least one of the first plate and second plate,
    wherein the extension attachment is configured to couple with the level attachment mechanism to releasably couple the level to the leveling extension such that the first extension reference surface is parallel to the first reference surface of the level and the second extension reference surface is parallel to the second reference surface of the level.

12. The level assembly of claim 11, wherein the level attachment mechanism comprises a first magnet recessed within the second reference surface with an outer surface of the first magnet positioned substantially flush with the second reference surface.

13. The level assembly of claim 12, wherein the level attachment mechanism comprises a second magnet recessed within the first reference surface with an outer surface of the second magnet positioned substantially flush with the first reference surface.

14. The level assembly of claim 12, wherein the level attachment mechanism comprises a second magnet recessed within the first or second face with an outer surface of the second magnet positioned substantially flush with the first or second face.

15. The level assembly of claim 11, wherein the level further comprises a third reference surface between the first and second reference surfaces disposed at a 45-degree angle relative to each of the first and second reference surfaces.

16. The level assembly of claim 11, wherein the second plate bisects the first plate.

17. The level assembly of claim 11, wherein the leveling extension consists of the first plate, the second plate, and the extension attachment mechanism.

\* \* \* \* \*